(12) United States Patent
Konicek

(10) Patent No.: US 8,824,879 B2
(45) Date of Patent: *Sep. 2, 2014

(54) TWO WORDS AS THE SAME VOICE COMMAND FOR A CAMERA

(71) Applicant: Jeffrey C. Konicek, Tolono, IL (US)

(72) Inventor: Jeffrey C. Konicek, Tolono, IL (US)

(73) Assignee: Cutting Edge Vision LLC, Scottsdale, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 14/199,855

(22) Filed: Mar. 6, 2014

(65) Prior Publication Data

US 2014/0184840 A1 Jul. 3, 2014

Related U.S. Application Data

(60) Continuation of application No. 13/717,681, filed on Dec. 17, 2012, which is a continuation of application No. 13/087,650, filed on Apr. 15, 2011, now Pat. No. 8,467,672, which is a continuation of application No. 12/710,066, filed on Feb. 22, 2010, now Pat. No. 7,933,508, which is a division of application No. 11/163,391, filed on Oct. 17, 2005, now Pat. No. 7,697,827.

(51) Int. Cl.
*G03B 17/00* (2006.01)
*H04N 5/232* (2006.01)

(52) U.S. Cl.
CPC .................................. *H04N 5/232* (2013.01)
USPC ........................................................... 396/56

(58) Field of Classification Search
USPC ........................................................... 396/56
See application file for complete search history.

(56) References Cited

U.S. PATENT DOCUMENTS

| 4,087,630 A | 5/1978 | Browning et al. |
| 4,389,109 A | 6/1983 | Taniguchi et al. |

(Continued)

FOREIGN PATENT DOCUMENTS

| EP | 0376618 | 7/1990 |
| GB | 2380556 | 4/2003 |

(Continued)

OTHER PUBLICATIONS

Adams, Russ, "Sourcebook of Automatic Identification and Data Collection," Van Norstrand Reinhold, New York, Dec. 31, 1990.

(Continued)

*Primary Examiner* — Rodney Fuller
(74) *Attorney, Agent, or Firm* — Law Offices of Steven G. Lisa, Ltd.; Justin Lesko, Esq.; James D. Busch, Esq.

(57) ABSTRACT

A system and method is disclosed for enabling user friendly interaction with a camera system. Specifically, the inventive system and method has several aspects to improve the interaction with a camera system, including voice recognition, gaze tracking, touch sensitive inputs and others. The voice recognition unit is operable for, among other things, receiving multiple different voice commands, recognizing the vocal commands, associating the different voice commands to one camera command and controlling at least some aspect of the digital camera operation in response to these voice commands. The gaze tracking unit is operable for, among other things, determining the location on the viewfinder image that the user is gazing upon. One aspect of the touch sensitive inputs provides that the touch sensitive pad is mouse-like and is operable for, among other things, receiving user touch inputs to control at least some aspect of the camera operation. Another aspect of the disclosed invention provides for gesture recognition to be used to interface with and control the camera system.

27 Claims, 8 Drawing Sheets

(56) References Cited

U.S. PATENT DOCUMENTS

| | | | |
|---|---|---|---|
| 4,399,327 | A | 8/1983 | Yamamoto et al. |
| 4,658,425 | A | 4/1987 | Julstrom |
| 4,951,079 | A | 8/1990 | Hoshino et al. |
| 5,027,149 | A * | 6/1991 | Hoshino et al. ............ 396/56 |
| 5,239,337 | A | 8/1993 | Takagi et al. |
| 5,245,381 | A | 9/1993 | Takagi et al. |
| 5,253,008 | A | 10/1993 | Konishi et al. |
| 5,331,149 | A | 7/1994 | Spitzer et al. |
| 5,461,453 | A | 10/1995 | Watanabe et al. |
| 5,546,145 | A | 8/1996 | Bernardi et al. |
| 5,579,046 | A * | 11/1996 | Mitsuhashi et al. ....... 348/231.4 |
| 5,581,323 | A | 12/1996 | Suzuki et al. |
| 5,600,399 | A | 2/1997 | Yamada et al. |
| 5,745,810 | A | 4/1998 | Matsushima |
| 5,748,992 | A | 5/1998 | Tsukahara et al. |
| 5,749,000 | A | 5/1998 | Narisawa |
| 5,765,045 | A | 6/1998 | Takagi et al. |
| 5,797,046 | A | 8/1998 | Nagano et al. |
| 5,907,723 | A | 5/1999 | Inoue |
| 5,917,921 | A | 6/1999 | Sasaki |
| 5,970,258 | A | 10/1999 | Suda et al. |
| 6,021,278 | A | 2/2000 | Bernardi et al. |
| 6,101,338 | A | 8/2000 | Bernardi et al. |
| 6,115,556 | A | 9/2000 | Reddington |
| 6,181,377 | B1 | 1/2001 | Kobayashi |
| 6,499,016 | B1 | 12/2002 | Anderson |
| 6,538,697 | B1 | 3/2003 | Honda et al. |
| 6,591,239 | B1 | 7/2003 | McCall |
| 6,593,956 | B1 | 7/2003 | Potts et al. |
| 6,637,883 | B1 | 10/2003 | Tengshe et al. |
| 6,674,964 | B2 | 1/2004 | Irie |
| 6,721,001 | B1 | 4/2004 | Berstis |
| 6,758,563 | B2 | 7/2004 | Levola |
| 6,795,558 | B2 * | 9/2004 | Matsuo ............ 381/92 |
| 7,046,924 | B2 | 5/2006 | Miller et al. |
| 7,117,519 | B1 | 10/2006 | Anderson et al. |
| 7,149,688 | B2 | 12/2006 | Schalkwyk |
| 7,259,785 | B2 | 8/2007 | Stavely et al. |
| 7,443,419 | B2 | 10/2008 | Anderson et al. |
| 7,697,827 | B2 * | 4/2010 | Konicek ............ 396/56 |
| 7,933,508 | B2 | 4/2011 | Konicek |
| 8,467,672 | B2 | 6/2013 | Konicek |
| 8,645,325 | B2 | 2/2014 | Anderson et al. |
| 2002/0051638 | A1 | 5/2002 | Arakawa |
| 2002/0105575 | A1 | 8/2002 | Hinde |
| 2003/0090572 | A1 | 5/2003 | Belz et al. |
| 2003/0179888 | A1 * | 9/2003 | Burnett et al. ............ 381/71.8 |
| 2004/0103111 | A1 | 5/2004 | Miller et al. |
| 2004/0192421 | A1 | 9/2004 | Kawahara |
| 2004/0196399 | A1 | 10/2004 | Stavely |
| 2005/0001024 | A1 | 1/2005 | Kusaka et al. |
| 2005/0094019 | A1 | 5/2005 | Grosvenor et al. |
| 2005/0128311 | A1 * | 6/2005 | Rees et al. ............ 348/211.99 |
| 2005/0159955 | A1 | 7/2005 | Oerder |
| 2005/0195309 | A1 * | 9/2005 | Kim et al. ............ 348/345 |
| 2005/0212817 | A1 | 9/2005 | Cannon et al. |
| 2006/0099995 | A1 | 5/2006 | Kim et al. |
| 2006/0239672 | A1 | 10/2006 | Yost et al. |
| 2007/0081090 | A1 | 4/2007 | Singh |
| 2007/0100632 | A1 * | 5/2007 | Aubauer ............ 704/275 |

FOREIGN PATENT DOCUMENTS

| | | |
|---|---|---|
| JP | 56012632 | 2/1981 |
| JP | 58080631 | 5/1983 |
| JP | 58137828 | 8/1983 |
| JP | 60205433 | 10/1985 |
| JP | 1056428 | 3/1989 |
| JP | 1191838 | 8/1989 |
| JP | 1191840 | 8/1989 |
| JP | 2230225 | 9/1990 |
| JP | 2000231142 | 8/2000 |
| JP | 2000235216 | 8/2000 |
| JP | 2000284794 | 10/2000 |
| JP | 2001305642 | 2/2001 |
| JP | 2004120526 | 4/2004 |
| JP | 2005024792 | 1/2005 |
| JP | 2005027002 | 1/2005 |
| JP | 2005333582 | 12/2005 |
| WO | WO2005050308 | 6/2005 |
| WO | WO2006062966 | 6/2006 |

OTHER PUBLICATIONS

Bernardi, Bryan D., "Speech Recognition Camera with a Prompting Display," The Journal of the Acoustical Society of America, vol. 108, Issue 4, Oct. 2000, p. 1383.

Bernardi, Bryan D., "Speech Recognition Camera with a Prompting Display," The Journal of the Acoustical Society of America, vol. 109, Issue 4, Apr. 2001, p. 1287.

Chapman, William D. "Prospectives in Voice Response from Computers," R.L.A. Trost, "Film Slave," Nov. 1976, Elektor, vol. 2, No. 11, pp. 1135-1137.

Goode, Georgianna, et al., Voice Controlled Stereographic Video Camera System, Proc. SPIE vol. 1083, p. 35, Three-Dimensional Visualization and Display Technologies; Scott S. Fisher: Woodrow E. Robbins, Eds.

Harif, Shlomi, Recognizing non-verbal sound commands in an interactive computer controlled speech word recognition display system, Acoustical Society of America Journal, vol. 118, Issue 2, pp. 599-599 (2005).

Hermes operating system now also listens to "his British master's voice" (Nov. 1999).

Morgan, Scott Anthony, Speech command input recognition system for interactive computer display with term weighting means used in interpreting potential commands from relevant speech terms, The Journal of the Acoustical Society of America, vol. 110, Issue 4, Oct. 2001, p. 1723.

Panasonic VLG201CE-S Video Intercom System with Silver door station.

Philips, M.L. Adv. Resource Dev. Corp., Columbia, MD, Voice control of remote stereoscopic systems Voice control of remote stereoscopic systems, by, Southeastcon '90. Proceedings., IEEE, Apr. 1-4, 1990, 594-598 vol. 2.

Reichenspurner, et al., Use of the voice-controlled and computer-assisted surgical system ZEUS for endoscopic coronary artery bypass grafting. The Journal of thoracic and cardiovascular surgery, Jul. 1999.

Robotics: the Future of Minimally Invasive Heart Surgery (May 2000).

ST Microelectronics TSH512 Hi-fi Stereo/mono Infrared Transmitter and Stereo Sub-carrier Generator (Oct. 2005).

Non-Final Office Action in U.S. Appl. No. 11/163,391, (Sep. 25, 2008).

Response to Non-Final Office Action in U.S. Appl. No. 11/163,391 (Jan. 9, 2009).

Non-Final Office Action in U.S. Appl. No. 11/163,391, (Apr. 22, 2009).

Response to Non-Final Office Action in U.S. Appl. No. 11/163,391 (Sep. 22, 2009).

Final Office Action in U.S. Appl. No. 11/163,391, (Dec. 18, 2009).

Response to Final Office Action in U.S. Appl. No. 11/163,391 (Jan. 11, 2010).

Non-Final Office Action in U.S. Appl. No. 12/710,066, (May 3, 2010).

Response to Non-Final Office Action in U.S. Appl. No. 12/710,066 (Aug. 3, 2010).

Final Office Action in U.S. Appl. No. 12/710,066, (Oct. 18, 2010).

Response to Final Office Action in U.S. Appl. No. 12/710,066 (Dec. 20, 2010).

Non-Final Office Action in U.S. Appl. No. 13/087,650, (Apr. 19, 2012).

Response to Non-Final Office Action in U.S. Appl. No. 13/087,650 (Jul. 19, 2012).

Non-Final Office Action in U.S. Appl. No. 13/717,681, (May 21, 2013).

(56) References Cited

OTHER PUBLICATIONS

Response to Non-Final Office Action in U.S. Appl. No. 13/717,681 (Nov. 15, 2013).
File History, U.S. Appl. No. 11/163,391 (now issued Patent No. 7,697,827) to Konicek (Filed Oct. 2005).
File History, U.S. Appl. No. 12/710,066 (now issued Patent No. 7,933,508) to Konicek (Filed Feb. 2010).
File History, U.S. Appl. No. 13/087,650 (now issued Patent No. 8,467,672) to Konicek (Filed Apr. 2011).
File History, U.S. Appl. No. 13/717,681 to Konicek, (filed Dec. 2012).
Non-Final Office Action in U.S. Appl. No. 13/717,681, (Apr. 3, 2014).
Non-Final Office Action in U.S. Appl. No. 14/203,129, (Apr. 25, 2014).
Response to Non-Final Office Action in U.S. Appl. No. 14/203,129, (Jun. 3, 2014).
Response to Non-Final Office Action in U.S. Appl. No. 13/717,681 (Jun. 30, 2014).

* cited by examiner

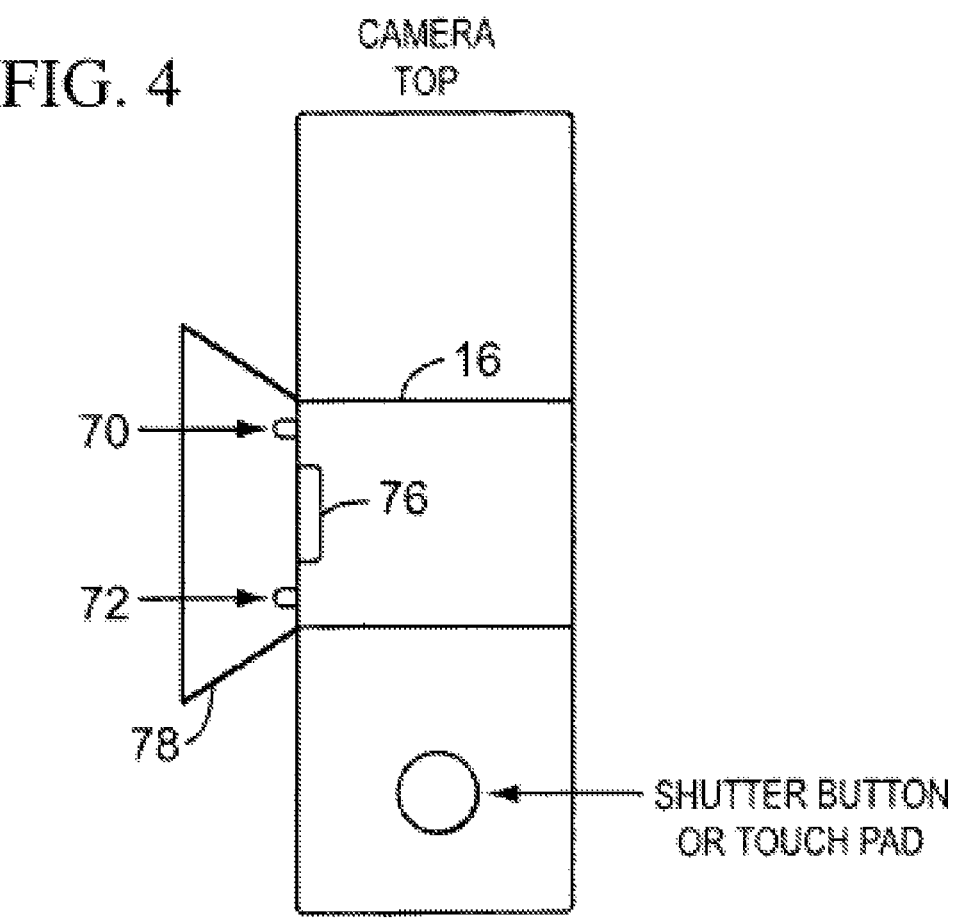

TWO WORDS AS THE SAME VOICE COMMAND FOR A CAMERA

CROSS REFERENCE TO RELATED APPLICATIONS

This application is a continuation of pending application Ser. No. 13/717,681, filed Dec. 17, 2012, which claims the benefit of application Ser. No. 13/087,650 (now issued U.S. Pat. No. 7,697,827), filed Apr. 15, 2011, which claims the benefit of application Ser. No. 12/710,066 (now issued U.S. Pat. No. 7,933,508), filed Feb. 22, 2010, which claims the benefit of application Ser. No. 11/163,391 (now issued U.S. Pat. No. 7,697,827), filed Oct. 17, 2005, all of which are herein incorporated by reference.

BACKGROUND OF THE INVENTION

Digitally-based and film-based cameras abound and are extremely flexible and convenient. One use for a camera is in the taking of self portraits. Typically, the user frames the shot and places the camera in a mode whereby when the shutter button is depressed; the camera waits a predetermined time so that the user may incorporate himself back into the shot before the camera actually takes the picture. This is cumbersome and leads to nontrivial problems. Sometimes the predetermined delay time is not long enough. Other times, it may be too long. For participates who are in place and ready to have their picture taken, especially children, waiting with a smile on their face for the picture to be snapped by the camera can seem endless even if it is just a few seconds long. Additionally, many who might like to be included into a shot find themselves not able to be because they have to take the picture and it is simply too much trouble to set up for a shutter-delayed photograph.

Voice recognition techniques are well known in the art and have been applied to cameras, see for example, U.S. Pat. Nos. 4,951,079, 6,021,278 and 6,101,338 which are herein incorporated by reference. It is currently possible to have fairly large vocabularies of uttered words recognized by electronic device. Speech recognition devices can be of a type whereby they are trained to recognize a specific person's vocalizations, so called speaker dependent recognition, or can be of a type which recognizes spoken words without regard to who speaks them, so called speaker independent recognition. Prior art voice operated cameras have several defects remedied or improved upon by various aspects of the present invention more fully disclosed below. One such problem is that in self portrait mode, the camera may snap the picture while the user is uttering the command. Another defect is that the microphone coupled to the voice recognition unit is usually mounted on the back of the camera. This placement is non-optimal when the user is in front of the camera as when taking a self portrait. Still another problem with prior art voice activated cameras is that they associate one vocalization or utterance to one camera operation. Thus, the user must remember which command word is to be spoken for which camera operation. This is overly constraining, unnatural, and significantly reduces the utility of adding voice recognition to the camera.

One prior art implementation of voice recognition allows for menu driven prompts to help guide the user through the task of remembering which command to speak for which camera function. This method however requires that the user be looking at the camera's dedicated LCD display for the menu. One aspect of the present invention provides for the menus to be displayed in the electronic view finder of the camera and be manipulated with both voice and gaze. Another aspect of the present invention incorporates touchpad technology which is typically used in laptop computers, such technology being well know in the art, as the camera input device for at least some functions.

SUMMARY OF THE INVENTION

A self-contained camera system, according to various aspects of the present invention, includes voice recognition wherein multiple different vocalizations can be recognized and wherein some such recognized vocalizations can be associated with the same camera command. Another aspect of the invention provides for multiple microphones disposed on or in the camera system body and be operable so that the user can be anywhere around the camera system and be heard by the camera system equally well. According to other aspects of the present invention, the camera system viewfinder includes gaze tracking ability and in exemplary preferred embodiments, gaze tracking is used alone or in combination with other aspects of the invention to, for example, manipulate menus, improve picture taking speed, or improve the auto focus capability of the camera. Other aspects of the present invention, such as the addition of touchpad technology and gesture recognition provide for a improved and more natural user interface to the camera system.

Thus, it is an object of the invention to provide an improved self-portrait mode for a camera system. It is further an object of the invention to provide an improved user interface for a camera system. It is yet a further object of the invention to make a camera system more user friendly with a more natural and intuitive user interface. It is still a further object of the invention to broaden the capabilities of the camera system. It is further an object of the invention to more easily allow a user to compose a shot to be taken by the camera system. It is still further an object of the invention to improve image quality of pictures taken by the camera system. It is yet another object of the invention to improve the speed of picture taking by the camera system.

BRIEF DESCRIPTION OF THE DRAWINGS

FIG. 4 shows an exemplary embodiment of a wink detector according to various aspects of the present invention.

DESCRIPTION OF PREFERRED EXEMPLARY EMBODIMENTS

Figure 1A:
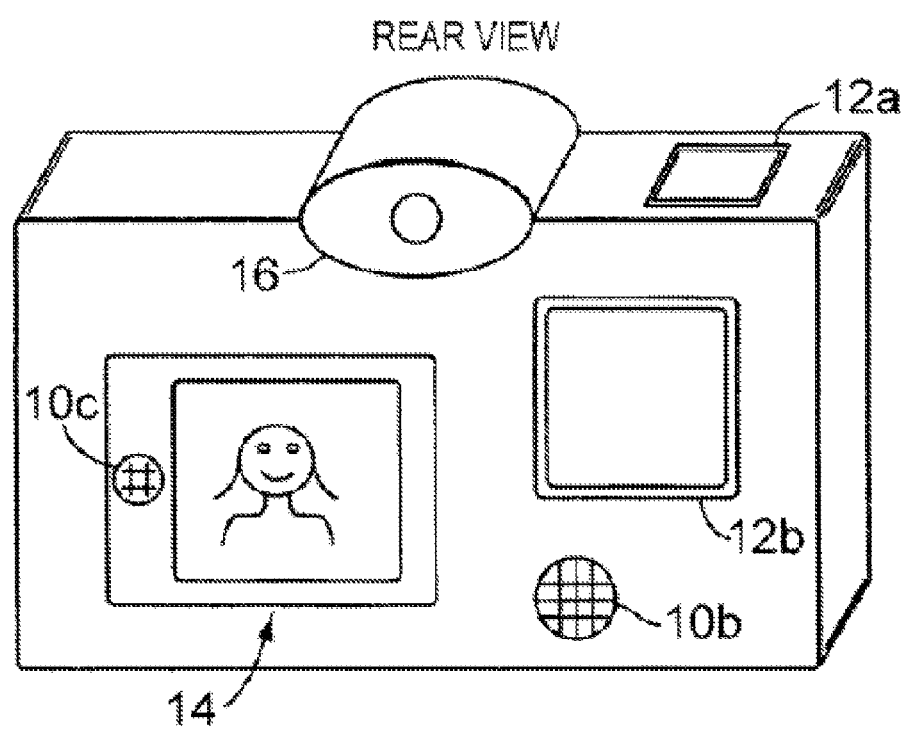
FIG. 1A is an exemplary perspective view of the rear (back) of the camera system according to various aspects of the present invention.
Figure 1B:
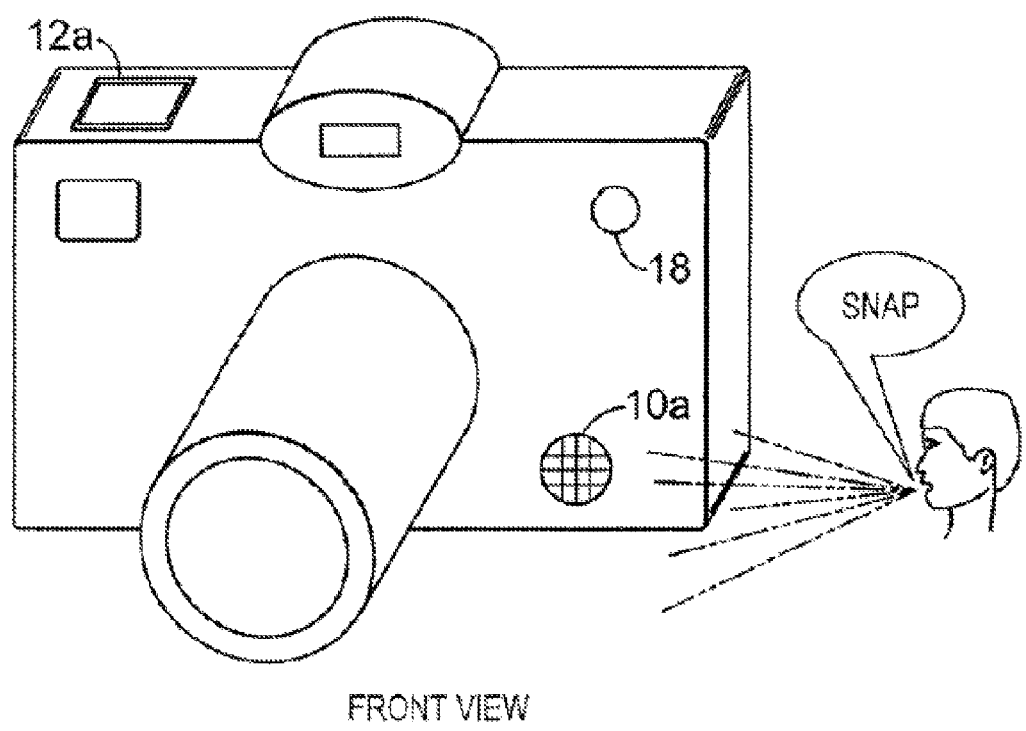
FIG. 1B is an exemplary perspective view of the front of the camera system according to various aspects of the present invention.

One aspect of the present invention solves several of the problems of the prior art voice recognition cameras in that this aspect provides for more than one microphone to be the source to the recognition unit. With reference to FIG. 1, this aspect of the present invention provides for at least two microphones to be used, one microphone, 10b, placed on the back of the camera and one microphone, 10a, placed on the front, either of which can receive voice commands. In a first preferred embodiment of this aspect of the invention, a detection device determines which microphone is to be used as the input to the recognition unit based upon the strength of the voice signal or sound level received by each of the microphones. In another preferred embodiment, the outputs of the microphones are combined as the input to the voice recognition unit. In still another embodiment, the user can select which microphone is used as the input to the voice recognition unit, for example, by a switch or by selection through a camera menu.

Figure 2:
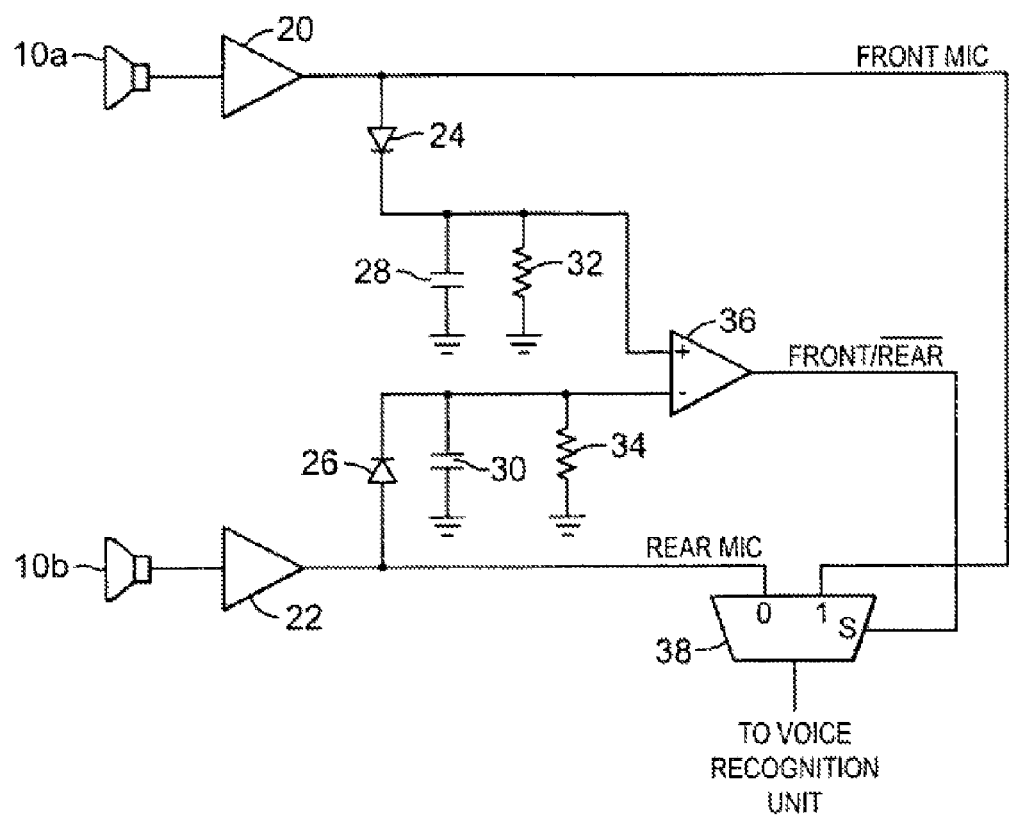
FIG. 2 is a functional representation of automatic microphone selection circuitry that may be uses in various aspects of the present invention.

Automatic microphone selection is preferred and with reference to FIG. 2, microphones 10a and 10b are each amplified by amplifiers 20 and 22 respectively. Diode 24, capacitor 28 and resister 32 form a simple energy detector and filter for microphone 10a. The output of this detector/filter is applied to one side of a comparator, 36. Similarly, diode 26, capacitor 30, and resister 34 form the other energy detector associated with microphone 10b. The output of this filter/detector combination is also applied to comparator 36. Thus, the output of this comparator selects which amplified microphone output is passed to the voice recognition unit through multiplexer 38 based on which amplified microphone output contains the greatest energy.

Figure 3:
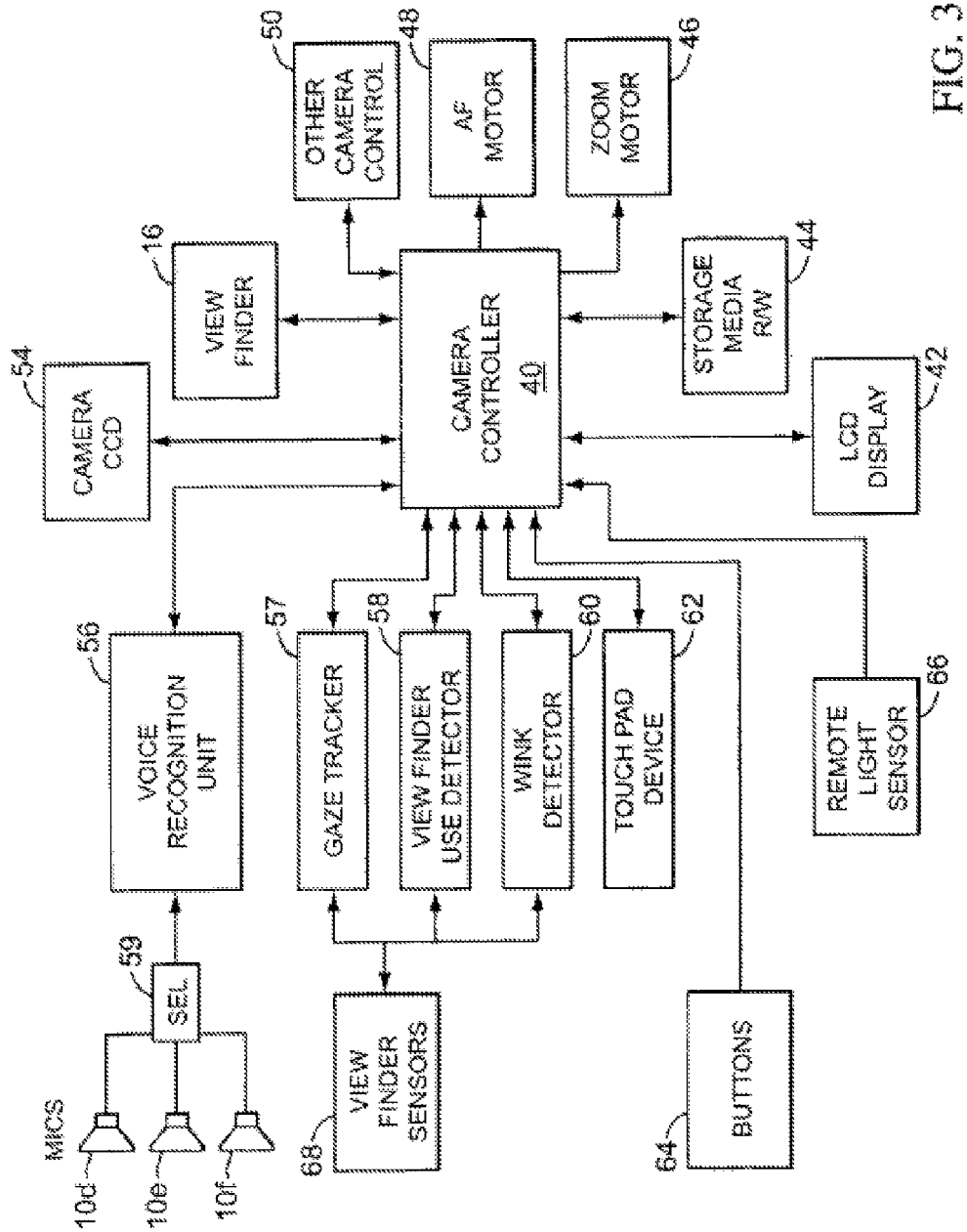
FIG. 3 shows an exemplary functional block diagram of an inventive camera system implementing various aspects of the present invention.

In yet another novel embodiment of this aspect of the invention, the multiple microphones are preferably associated with multiple voice recognition units or, alternatively, with different voice recognition algorithms well know in the art. The outputs of these multiple voice recognition units or different voice recognition algorithms are then coupled to the camera controller (FIG. 3 element 40). The camera controller preferably selects one of these outputs as being the camera controller's voice recognition input. Alternatively, the camera controller accepts the outputs of all the voice recognition units or algorithms and preferably uses a voting scheme to determine the most likely recognized command. This would obviously improve recognition rates and this aspect of the invention is contemplated to have utility beyond camera systems including, by way of example and not limitation, consumer computer devices such as PCs and laptops; portable electronic devices such as cell phones, PDAs, IPODs, etc.; entertainment devices such as TVs, video recorders, etc; and other areas.

To illustrate this embodiment using the example of the camera system having microphones on its frontside and backside given above, each of these microphones is coupled to a voice recognition unit. When an utterance is received, each voice recognition unit recognizes the utterance. The camera controller then selects which voice recognition unit's recognition to accept. This is preferably based on the energy received by each microphone using circuitry similar to FIG. 2 Alternatively, the selection of which voice recognition unit to use would be a static selection. Additionally, both recognizers' recognition would be considered by the camera controller with conflicting results resolved by voting or using ancillary information (such as microphone energy content).

An embodiment using multiple algorithms preferably has one voice recognition algorithm associated with the frontside microphone and, a different voice recognition algorithm associated with the backside microphone. Preferably, the voice recognition algorithm associated with the frontside microphone is adapted to recognize vocalizations uttered from afar (owing to this microphone probably being used in self-portraits), while the voice recognition algorithm associated with the backside microphone is optimal for closely uttered vocalizations. Selection of which algorithm is to be used as the camera controller input is preferably as above. Alternatively, as above, the selection would be by static selection or both applied to the camera controller and a voting scheme used to resolve discrepancies. While the above example contemplates using different voice recognition algorithms, there is no reason this must be so. The same algorithms could also be used in which case this example functions the same as multiple voice recognition units.

It is further contemplated in another aspect of the invention that the voice recognition subsystem be used in conjunction with the photograph storing hardware and software. In a preferred use of this aspect of the invention, the user utters names to be assigned to the photographs during storage and, later, utter then again for recall of the stored image. Thus, according to this aspect of the present invention, a stored photograph can be recalled for display simply by uttering the associated name of the photograph. The name association is preferably by direct association, that is, the name stored with the picture. In a second preferred embodiment, the photograph storage media contains a secondary file managed by the camera system and which associates the given (i.e., uttered) name with the default file name assigned by the camera system's storage hardware and/or software to the photograph when the photograph is stored on the storage media. According to the second embodiment, when a photograph is to be vocally recalled for viewing, the camera system first recognizes the utterance (in this case, the name) which will be used to identify the picture to be recalled. The camera system then scans the association file for the name which was uttered and recognized. Next, the camera system determines the default name which was given to the photograph during storage and associated with the user-given name (which was uttered and recognized) in the association file. The camera system then recalls and displays the photograph by this associated default name.

In another preferred embodiment, the voice recognition subsystem of the improved camera system recognizes at least some vocalized letters of the alphabet and/or numbers so that the user may assign names to pictures simply by spelling the name by vocalizing letters and/or numbers. Another aspect of the invention provides that stored photographs be categorized on the storage media through use of voice-recognized utterances being used to reference and/or create categories labels and that, additionally, the recognizer subsystem preferably recognize key words for manipulating the stored pictures. For instance, according to this aspect of the invention, the inventive camera system would recognize the word "move" to mean that a picture is to be moved to or from a specific category. More specifically, "move, Christmas" would indicate that the currently referenced photograph is to be moved to the Christmas folder. An alternative example is "John move new year's" indicating that the picture named john (either directly named or by association, depending on embodiment) be moved to the folder named "New Year's". It is further contemplated that the folder names may be used for picture delineation as well. For instance, the picture "John" in the Christmas folder is not the same as the picture "John" in the Birthday folder and the former may be referenced by "Christmas, John" while the latter is referenced by "Birthday, John".

Another aspect of the present invention provides that the voice recognition camera system be capable of associating more than one vocal utterance or sound with a single command. The different utterances are contemplated to be different words, sounds or the same word under demonstrably different conditions. As an example, the voice recognition camera system of this aspect of the present invention allows the inventive camera system to understand, for example, any of "shoot", "snap", "cheese", and a whistle to indicate to the camera system that a picture is to be taken. In another example, perhaps the phrase and word "watch the birdie" and "click" instruct the camera to take the picture. It is further envisioned that the user select command words from a predetermined list of the camera command words and that he then select which words correspond to which command. It is alternatively envisioned that the association of multiple recognizable words to camera commands may also be predetermined or preassigned. In another alternate embodiment, the inventive camera system allows the user to teach the camera system which words to recognize and also inform the camera system as to which recognized words to associate with which camera commands. There are obviously other embodiments for associating recognized vocalizations to camera commands and the foregoing embodiments are simply preferred examples.

In another embodiment of this aspect of the present invention, the user has his uttered commands recognized under demonstrably different conditions and recognized as being different utterances. For instance, according to this aspect of the invention, the voice operated camera system operates so that it understand commands vocalized close to the camera (as if the user is taking the picture in traditional fashion with the camera back to his face) and significantly farther away (as if the user is taking a self portrait picture and is part of the shot and thus has to vocalize loudly to the front of the camera.) For this illustration, in a preferred embodiment the user teaches the words to the camera under the different conditions anticipated. For example, the user would teach the camera system by speaking the word "snap" close to the camera and inform the camera that this is a picture taking command and would then stand far from the camera and say "snap", thus teaching another utterance, and instruct the camera that this is also a picture taking command. These two different utterances of the same word under different conditions would be stored and recognized as different utterances. This aspect of the invention contemplates that the words vocalized and/or taught need not be the same word and, as illustrated above, different words would also be considered different utterances as well.

Since voice recognition is not always 100 percent accurate, another aspect of the present invention contemplates that the camera system or a remote device, or both, preferably provide an indication that a voice command was or was not understood. Thus, using the self portrait example above, if the user vocalizes the command to take a picture but the camera system does not properly recognize the vocalization as being something it understands, the camera system would beep, or light an LED, etc. to indicate it's misrecognition. Because of the relatively small number of anticipated camera commands and allowing for multiple vocalizations to command the same action, it is expected that the recognition rates will be quite high and fairly tolerant of extraneous noise without necessarily resorting to the use of a highly directional or closely coupled (to the user's mouth) microphone though the use of such devices is within the scope of the invention.

It is anticipated that the user of the inventive camera system may be too far away from the camera system for the camera system to recognize and understand the user's vocalizations. Thus, another aspect of the invention provides that the camera is equipped with a small laser sensor (FIG. 1 element 18) or other optically sensitive device such that when a light of a given frequency or intensity or having a given pulse sequence encoded within it is sensed by the camera system equipped with the optically sensitive device, the camera system immediately, or shortly thereafter (to give the user time to put the light emitting device down or otherwise hide it, for example) takes a picture. The light emitting device is preferably a laser pointer or similar, stored within the camera housing when not needed so as to not be lost when not in use. Additionally, the light emitting device's power source would preferably be recharged by the camera system's power source when so stored. In another embodiment, it is also contemplated that the light emitting device may be housed in a remotely coupled display which is disclosed below. The light emitting device preferably includes further electronics to regulate the emitted light intensity or to encode a predetermined pulse sequence (on-off pulses for example) or otherwise onto the emitted light, all of which techniques are well known in the art, which the camera system of this aspect of the present invention would receive and recognize by methods well known in the art.

Another aspect of the present invention provides for there being a predetermined delay introduced between recognizing a voice command and the camera actually implementing the command. This aspect of the invention allows time, for example, for the user to close his mouth or for others in a self-portrait shot to settle down quickly before the picture is actually taken. In a first preferred embodiment of this aspect of the invention, the delay is implemented unconditionally for at least the picture taking command. In a second preferred embodiment of this aspect of the invention, the delay introduced is dependent upon from where the command came relative to the camera system. For instance, if the camera system recognized the command as coming from the frontside microphone, delay is used, but if the command comes from the backside microphone, then no delay is implemented. The simple energy detection circuitry of FIG. 2, described above is easily adapted for this function. In an alternative embodiment, implementation of the delay is dependent upon the location of the microphone due to the orientation of the flip-up or swivel LCD display when the microphone is attached to the LCD display (FIG. 1, element 12c). For example, if the microphone in the display sub-housing is oriented forward relative to the camera body then delay is implemented, if the microphone is not oriented forward then no delay is introduced. Determining the orientation of this microphone relative to the camera body is known in the art and would typically be done with switches or other sensor devices. Another preferred embodiment of this aspect of the invention implements the delay for only certain commands, such as the command to take a picture. In yet another preferred embodiment, whether the delay is implemented at all is selectable by the user.

Another aspect of the present invention provides that the camera LCD display (FIG. 1, element 14) employs touch sensitive technology. This technology is well known in the computer art and can be any of resistive, capacitive, RF, etc touch technology. This aspect of the present invention allows the user to interact with menus, features and functions displayed on the LCD display directly rather than through ancillary buttons or cursor control. For those embodiments of touch technology requiring use of a stylus, it is further contemplated that the camera body house the stylus for easy access by the user.

According to another aspect of the present invention, it is envisioned that the current dedicated LCD display (FIG. 1, element 14) incorporated on a digital camera be made to be removable and be extendable from the camera by cable, wireless, optical, etc. interconnection with the camera. In one embodiment, this remote LCD would be wire-coupled to receive display information from the digital camera through a pluggable port. In another embodiment, the remote LCD would be wirelessly coupled to the digital camera through any of several technologies well understood in the art including, by way of example only, Bluetooth, WIFI (802.11 a/b/g/n), wireless USB, FM, optical, etc. In a another embodiment of this aspect of the invention, the remotely coupled display would serve the dual purpose of being a remote input terminal to the camera system in addition to being a dedicated display for the camera system. Preferably, as mentioned earlier, the display is touch sensitive using any of the touch sensitive technology well understood in the art such as resistive, capacitive, RF, etc., methods mentioned above. Touch commands input by the user would be coupled back to the camera system as needed. It is also contemplated that the remote display house the stylus if one is required.

In another preferred embodiment, the remotely coupled display has buttons on it to control the camera system. In another embodiment, the remotely coupled display contains the microphone for receiving the voice commands of the user, digitizing the received voice, analyzing and recognizing the vocalization locally and sending a command to the camera system. In another preferred embodiment, the remotely coupled display containing the microphone simply digitizes the vocalization received by the microphone and transmits the digitized vocalization to the camera system for recognition of the vocalization by the camera system itself. In all embodiments of the wireless remote display, it is preferred that the display contain its own power source, separate from the power source of the camera. It is also contemplated that the display's separate power source may be coupled to the camera's power source when the display is 'docked' to the camera so that both may share power sources or so that the camera's power source may recharge the display's power source.

According to another aspect of the present invention, the electronic view finder (EVF) typically used on modern digital cameras includes a gaze tracking capability which is well known in the art, see for example U.S. Pat. No. 6,758,563 to Levola which is herein incorporated by reference. In this aspect of the present invention, menus typically used for user interface to the camera are electronically superimposed in the image in the EVF. The gaze tracker subsystem is operable for determining the area or approximate location of the viewfinder image at which the user is gazing. Thus, by the user looking at different areas of the EVF image, the gaze tracker subsystem informs the camera system so that a mouse-like pointer or cursor is moved by the camera system to the area of the EVF image indicated by the gaze tracking device to be the area the user is viewing. Preferably, the user then speaks a command to indicate his selection of the item pointed to by the pointer image. Alternatively, the user may indicate through other methods that this is his selection, such as staring at a position in the image for a minimum predetermined time or pressing a button, etc. As an example, the EVF displays icons for flash, shutter speed, camera mode, etc (alone or superimposed on the normal viewfinder image.) By gazing at an icon, a small compositely rendered arrow, cursor, etc., in the EVF image is caused by the gaze tracker subsystem to move to point to the icon at which the user is determined to be gazing by the gaze tracking subsystem, for instance, the camera mode icon as an example here. Preferably, the user then utters a command which is recognized by the camera system as indicating his desire to select that icon, for example, "yes" or "open".

Alternatively, the icon is selected by the user gazing at the icon for some predetermined amount of time. When the icon is selected by whatever method, the EVF image shows a drop down menu of available camera modes, for example, portrait, landscape, fireworks, etc. The user, preferably, then utters the proper command word from the list or he may optionally gaze down the list at the mode he desires whereupon the gaze tracker subsystem directs that the pointer or cursor in the EVF image moves to the word and, preferably highlighting it, indicates that this is what the camera system thinks the user want to do. The user, preferably, then utters a command indicating his acceptance or rejection of that mode in this example, such as 'yes' or 'no'. If the command uttered indicates acceptance, the camera system implements the command, if the command indicates rejection of the selected command, the camera system preferably moves the pointer to a neighboring command. To leave a menu, the user may utter 'end' to return to the menu above or 'home' to indicate the home menu. Preferably, the user can also manipulate the pointer position by uttering commands such as "up", "down", "left" and "right" to indicate relative cursor movement. In this way, the user interacts with the camera in the most natural of ways, through sight and sound cooperatively. While the above example used the preferred combination of gaze and voice recognition, it is contemplated that gaze tracking be combined with other input methods such as pushing buttons (like a mouse click) or touch input disclosed below, or gesture recognition disclosed below, etc. as examples.

Another application of this aspect of the invention uses gaze tracking to assist the auto focus (AF) capability of the prior art camera. AF generally has too modes, one mode uses the entire image, center weighted, to determine focus, another mode allows different areas of the image to have greater weight in determining focus. In the second mode, the user typically pre-selects the area of the framed image that he wishes to be over-weighted by the AF capability. This is cumbersome in that the user must predict where he wants the weighting to be ahead of time, thus, this embodiment of this aspect of the invention provides that the gaze tracker subsystem inform the AF capability of the camera system as to the location of the image that the user is gazing and that the AF capability use this information to weight this area of the image when determining focus. It is contemplated that the AF system may only provide for discrete areas of the image to be so weighted and in this case, preferably, the AF capability selects the discrete area of the image closest to that being gazed upon.

Another embodiment of this aspect of the invention uses the gaze tracker to enable the flash of the camera system. Flash is common used to "fill" dimly lit photographic scenes but sometimes this is not warranted. Other times, it is desired to have "fill" flash because the area of the scene desired is dark but the rest of the scene is quite bright (taking a picture in shade for example) and the camera does not automatically provide "fill" flash because the overall image is bright enough. Typically, the amount of "fill" flash the camera will give is determined by the camera measuring the brightness of the scene. The inventive camera system with gaze tracking is used to enhance the prior art method of determining the desire and amount of "fill" flash in that the inventive camera system gives more weight, in determining the scene brightness, to the area of the scene indicated by the gaze tracker as being gazed upon.

Another aspect of the present invention adds touchpad technology to the prior art camera system. Use of the word 'touchpad' throughout this disclosure should be construed to mean either the touchpad itself or the touchpad with any or all of a controller, software, associated touchpad electronics, etc.

This touchpad technology is similar to the touchpad mouse pad used on laptop computers which is also well understood in the computer art. In a first preferred embodiment, the EVF (or LCD display) displays the menus as above and the user moves the cursor or mouse pointer around this image by use of his finger on the touchpad. This operation is virtually identical to that of the mouse in laptop computers and is well understood in the art. Preferably, the touch pad is mounted on the top of the camera at the location typically used for the shutter button (FIG. 1 element 12a). It is also preferred that the touchpad software implement 'tapping' recognition, also well known in the art, so that the user may operate the shutter button, make a selection, etc. simply by tapping the touchpad with his index finger, much the same way modern laptop driver software recognizes tapping of the touchpad as a click of the mouse button. It is also currently preferred that tapping recognition is used to make selections on the menus shown in the EVF, LCD display, or otherwise.

Another application of this aspect of the invention uses the touchpad to inform the camera system to zoom the lens simply by the user stroking his finger from front to back (for example, to zoom) or back to front over the touchpad (for example, to wide angle). For this aspect of the present invention, a preferred embodiment has the touchpad on the barrel of the lens. This is a most natural way to control zoom since the movement of the finger is a gesture with the user 'pulling' the object to be photographed closer (front to back stroke means zooming) or 'pushing' the object to be photographed away (back to front stroke means wide angle). According to another aspect of the invention, the touchpad replaces the shutter button functionality and the preferable location for this embodiment is top mounted. Preferably, the touchpad is tapped once to focus the camera and/or lock the AF and tapped a second time to trip the shutter. Alternatively, the inventive camera system simply senses the person's touch of the touchpad, auto focuses the camera and/or locks the focus or provides continually focusing while the person's touch is sensed and wherein a tap of the touchpad then trips the shutter. Preferably, the camera system enforces a maximum amount of time that the AF may be locked so that action photographs will not be badly focused. Automatically locking the AF settings for a maximum predetermined time after AF activation or continuously focus upon AF activation is also applicable to the prior art AF button activation method described below. While a computer-like touchpad was used to illustrate the above preferred embodiments of this aspect of the invention, the touch sensitive input device could be comprised of other structure, for instance, the aforementioned touch-sensitive LCD display. Also, throughout this disclosure, the word 'continuous' (and its variants, e.g., continually, etc.) should be construed to mean discretely continuous in addition to its analogue-world definition.

In a second preferred embodiment of this aspect of the invention, the touchpad is placed on the back of the camera (FIG. 1 element 12b) and is operable for manipulated the cursor and menus shown on the LCD or EVF display. This provides a much more natural and computer-like interface to the camera system. It is also contemplated that either embodiment of this aspect of the invention may be coupled with voice recognition so that the user may interact with the camera by touchpad manipulation in combination with voice commands. Additionally, combined with gaze tracking, the user can interact with the camera through touch, voice, and gaze (i.e., sight) to manipulate menus, control the camera system, compose the shot, focus, zoom, enable/disable flash, select macro or panoramic camera modes, etc.

One of the most annoying properties of the modern digital camera is the shutter delay that occurs when a picture is taken. That is, the delay between the user depressing the shutter button and the camera actually taking the picture. This delay can be as much as one second on some modern digital cameras and is typically due to the camera focusing and then taking the picture after the shutter button is depressed. One solution to this implemented by prior art cameras is for the camera to sense when the shutter button is depressed half way, then focus and lock the AF settings of the camera while the shutter button remains half way depressed, so that when the user depresses the shutter button the rest of the way, the picture is taken almost instantaneously. This solution is more often than not misused or misunderstood by novice users or those who do not use their camera regularly and can also result in blurred action photographs. Thus, one aspect of the present invention provides that the viewfinder be coupled to a unit for detecting when the user's eye is viewing through the viewfinder. When viewfinder use is detected, the inventive camera system preferably enables the auto focus system to continually focus thus ensuring that the shot is focused when the camera system is commanded to take a picture. Preferably, the gaze tracker is used for this determination though this aspect of the invention may be implemented without gaze tracking.

In a preferred embodiment of this aspect of the invention without gaze tracking, the viewfinder is equipped with a small light emitting device and a light detection device both well known in the art. With reference to FIG. 4, the light emitting device, 70, emits a frequency or frequencies of light some of which is reflected from the eyeball when a user is viewing through the viewfinder, 74. The light detection device, 72, is operable for sensing this reflected light and an amplifier (not shown) coupled to device 72, amplifies the signal from the light detection device, 72. Obviously, if there is no one viewing through the viewfinder, then there will be no reflected light from the eyeball and the amplifier output will be near ground, however, when a person peers into the viewfinder, light will be reflected from his eyeball and the output of the amplifier will be significantly larger. Thus, this system and method provides a way for detecting the use of the viewfinder by the user without providing gaze tracking ability. It is contemplated that this system and method be used with both EVF and optical (i.e., traditional) viewfinders and that viewport, 76, may be an LCD, optical lens, etc. Shroud 78 typically included on modern viewfinders helps to improve viewfinder use detection by cutting down on extraneous light reaching device 72 when the user is viewing through the viewfinder. It should be noted that the location of elements 70 and 72 in FIG. 4 is exemplary only and other placements of these elements are within the scope of this aspect of the invention. While the above embodiment of this aspect of the invention relied on eyeball reflectivity, in an alternate embodiment it is contemplated that the viewfinder use detect can be made with a light source and light detector juxtaposed wherein the eye interrupts the light between the two thus indicating viewfinder use, or that the shroud be fitted with a touch sensor around its outer ring that would sense the person's contact with the shroud when the viewfinder is in use. Additionally, it is contemplated that embodiments of this aspect of the invention may employ filters or other structures to help minimize false viewfinder use detection due to sunlight or other light sources shining on detector 72 when a user is not viewing through the viewfinder.

Another aspect of the present invention is to employ a wink-detector as part of the viewfinder of the camera. Preferably, the gaze tracker is modified for this purpose. Alternatively, the previously disclosed viewfinder use detector may also be employed. All that is required is to additionally detect the abrupt change in reflected light from the eye that would be caused by the eyelid wink. The wink-detector is contemplated to be used for shutter trip and/or AF activation or lock among other things. It is contemplated that it be used in the aforementioned application wherein the menus of the camera are displayed on the EVF. In this case, the wink detector preferably acts as a user selection detector device in that the user may select an item pointed to by the gaze tracker pointer or that is otherwise highlighted by the gaze tracker simply by winking. It is contemplated that the detected wink would preferably function in the camera system similarly to a left mouse click on a computer system when dealing with menus and icons. In this way, the camera system with wink detector of this aspect of the present invention becomes a optical gesture-recognizing camera wherein the gesture is optically received and electronically recognized (gesture recognition is also contemplated to be used in the touchpad software as described above.)

In an enhancement of this aspect of the invention, the wink detector subsystem discriminates between a wink and a blink by preferably determining the amount of time taken by the wink or blink. If the amount of time taken for the gesture (blinking or winking) is below a certain threshold, the gesture is considered a wink and disregarded.

Once a user of a camera has taken pictures, typically he will wish to print or otherwise develop the pictures for viewing, framing, etc. Another aspect of the present invention provides for simpler photo offloading from the modern digital camera when a set of predetermined conditions, such as day, time, number of pictures to offload, etc., are met. The camera system preferably includes the ability for the user to indicate to the camera which pictures to offload so that the camera offloads only those pictures that are so indicated by the user. In a first preferred embodiment of this aspect of the invention, the camera system is internally equipped with wireless interface technology by a wireless interface to the camera controller for interfacing directly to a photo printer or other photo rendering device. Currently preferred is WIFI (i.e., IEEE 802.11a/b/g/n) with alternatives being Bluetooth, or wireless USB all of which are known in the art. By connecting via WIFI, the inventive camera system can preferably access other devices on the LAN associated with the WIFI for the storing of pictures onto a computer, network drive, etc. In additional, preferably, devices on the network can access the camera system and the pictures within it directly and also access camera settings, upload new software or updates to the camera system, etc. Since one of the big complaints with wireless technology for small devices is the often-obtrusive antenna, it is greatly preferred for this aspect of the invention that the wireless hardware including antenna be completely contained within the body of the camera system.

In a second preferred embodiment of this aspect of the invention, the inventive camera system is equipped with software and hardware coupled to the camera controller allowing independent communication with a computer network for the primary purpose of communicating its pictures over the internet. Currently preferred is WIFI which is typically connected by LAN, routers, etc. to the internet and which usually allows WIFI-equipped devices to independently connect to the internet. Alternatively, the invention contemplates the use of wired LAN, cellular data networks, etc. as the interconnection technology used by the inventive camera system. The inventive camera system is further preferably equipped with a microbrowser that runs on the inventive camera system's camera controller which is preferably a microprocessor. It is contemplated that some embodiments may not be required a microbrowser (see enhancement below). Design and operation of microbrowser-equipped electronic devices for use with the internet is well known in the art and need not be discussed further. The camera system LCD display serves the purpose of displaying internet webpages when the user is navigating the internet in addition to its function as the camera display. So equipped, the inventive camera system can now independently upload its pictures to any of the internet-based photo printing services, such as those provided by Walmart.com, Walgreens.com, Kodak.com, etc., without the need for first storing the photos to a computer system and then connecting the computer system to the internet to upload the pictures. Use of these internet services for printing photos is preferred by many over use of a home photo printer because of the convenience, ease, availability, quality and lower per-picture printing costs. Providing the novel combination of a high photo-quality camera system with direct access to the internet according to this aspect of the present invention will further improve the utility of the camera system and these services.

In an enhancement to the above-disclosed embodiments of this aspect of the invention, the inventive camera system is operable for being instructed to automatically initiate a connection to the internet, LAN, printer, etc. whenever the predetermined conditions are met and it is in range of the network connection, (e.g., WIFI, Bluetooth, wireless USB, wired LAN, etc). Once the transmittal of the pictures is complete, the inventive camera system preferably terminates the connection. Additionally, the inventive camera system is preferably operable so that the automatic connection is made only at certain times of the day or weekends, etc., so as to confine picture transmission to periods of low network usage or periods of cheaper network access, etc. Also, it is currently preferred that the user be queried to allow the automatic connection though this is obviously not required and the connection can be made completely autonomously. Thus, in the first embodiment above, the inventive camera system automatically sends its pictures to a printer or other device on the LAN for printing or for remotely storing the pictures in the inventive camera system, whenever the inventive camera system is in range of the LAN network connection and connection can be made. In the second embodiment above, the inventive camera system automatically connects to the internet preferably via WIFI, although cellular network, etc. connection is also contemplated, when it has a predetermined number of pictures and can so connect, and will send the pictures to virtually any internet destination without user intervention. For example, the inventive camera system can be instructed to automatically send the pictures to an email account, internet picture hosting site, web-based photo printing site, the user's internet-connected home computer (when he is on vacation, for instance), etc. In this way, valuable pictures are immediately backed-up and the need for reliance on expensive camera storage media like flash cards, SD, etc. is greatly reduced.

Many prior art digital cameras can now record images continuously at 30 frames per second (i.e., take movies) along with sound. Thus, a prior art camera having an internet connection capability as herein taught combined with well known and straightforward editing methods enables inventive on-camera movie composition. According to this aspect of the invention, the inventive camera records a series of images, (e.g., a movie) and then the user downloads an MP3 file (i.e., a sound file) from a network (e.g., internet) source to be associated with the movie taken so that when the movie is played, the MP3 file also plays. Alternatively, the MP3 content is embedded in the movie, either as is, or re-encoded.

Additionally, the user may download other movie material or still images via the network connection for insertion in the camera-recorded movie or for the replacement of certain individual camera-taken "frames" in the movie.

FIG. 3 shows an exemplary functional block diagram of the improved, camera system according to various aspects of the present invention. The figure shows one possible exemplary embodiment contemplated and the figure should not be used to limit the teaching of this disclosure to a certain implementation, embodiment, combination of aspects of the present invention, or otherwise.

Another aspect of the present invention provides that prior art features of the cell phone are combined so that voice control of the camera in the cell phone can be accomplished. Many modern cell phones incorporating cams also provide voice recognition-driven dialing. Therefore, the functionality necessary for recognizing vocalizations within a cellular communication device exists in the art but has not been applied to the cell phone camera. This aspect of the present invention couples the voice recognition unit of a cell phone to the camera control unit of the cell phone either directly or via the cell phone controller, thus enabling voice control of the cell phone camera. Preferably, when recognizing a vocalization, the cell phone controller programming would also include the step of determining if the recognized vocalization was for camera control, or for dialing. Such determination would preferably be by reserving certain recognized keywords to be associated with camera functions (e.g., snap, shoot, etc). Alternatively, the cell phone may be explicitly placed into camera mode so that it is known ahead of time that recognized utterances are for camera control.

Cell phones being so light and without much inertia are hard to steady and the fact that the user must push a button on something so light makes it even harder to keep steady particularly given the small size of the shutter button on some cell phones. This aspect of the present invention would make picture taking on cell phones simpler and more fool proof.

Another aspect of the invention provides that the prior art voice recognition unit of the cell phone be adapted to recognize at least some email addresses when spoken. Another aspect of this inventive adaptation is to adapt the cell phone voice recognizer to identify the letters of the alphabet along with certain key words, for example, "space", "underscore", "question mark", etc and numbers so that pictures may be named when stored by spelling, for example. This aspect of the invention is contemplated to serve the dual purpose of being usable for text messaging or chat text input on the cell phone in addition to picture labeling.

Additionally, other aspects of the present invention taught for the improved camera system are applicable to the improved cell phone herein disclosed particularly the aspect of the present invention associating multiple different utterances to a single command. The aspect of the invention allowing for automatic connection to a LAN or the internet is also contemplated for use with cell phone cameras. This aspect of the invention ameliorates the prior art storage space limitation which severely hampers the utility of the cell phone camera. Cellular service providers typically charge a fee for internet access or emailing and so an automatic feature to connect to the net or send email for the purposes of transmitting pictures can improve revenue generation for these companies.

The embodiments herein disclosed for the various aspects of the present invention are exemplary and are meant to illustrate the currently preferred embodiments of the various aspects of the invention. The disclosed embodiments are not meant to be exhaustive or to limit application of the various aspects of the invention to those embodiments so disclosed.

There are other embodiments of the various aspects of the present invention that are within the scope of the invention. Additionally, not all aspects of the invention need to be practiced together, it is contemplated that subsets of the disclosed aspects of the present invention may be practiced in an embodiment and still be within the scope of the present invention. For instance, an embodiment combining a touch sensitive shutter button with a viewfinder use detector so that focusing is only accomplished when both the shutter button is touched and viewfinder use is detected. Another embodiment contemplated is to use the viewfinder use detector to automatically turn the EVF on and the LCD display off when viewfinder use is detected instead of the prior art method of pressing a button which typically toggles which of the two is on and which is off. Still another contemplated embodiment applies the touch gesture recognition typically used with the computer-like touchpad technology to a touch sensitive display, such as the touch sensitive LCD of the camera and other devices herein disclosed that utilize an LCD display. Combining various aspects of the invention herein disclosed, such as voice recognition, touch input, gaze tracking, etc for camera control provides much more natural and human interfacing to the camera system for the control of camera menus, camera features, camera options, camera settings, commanding picture taking, enabling flash, etc.

Figure 5A:
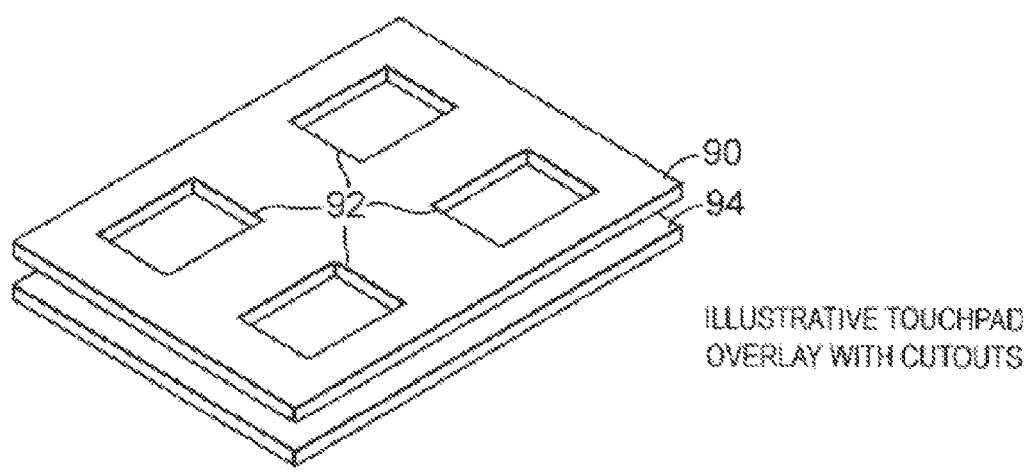
FIG. 5A shows an exemplary touchpad overlay with cut-outs according to various aspects of the present invention.
Figure 5B:
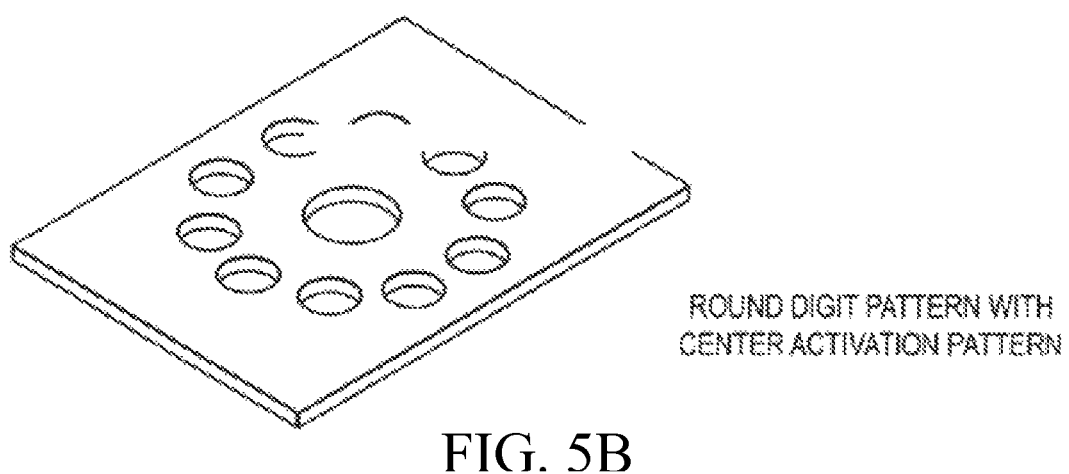
FIG. 5B shows an exemplary touchpad overlay with cut-outs according to various aspects of the present invention.
Figure 5C:
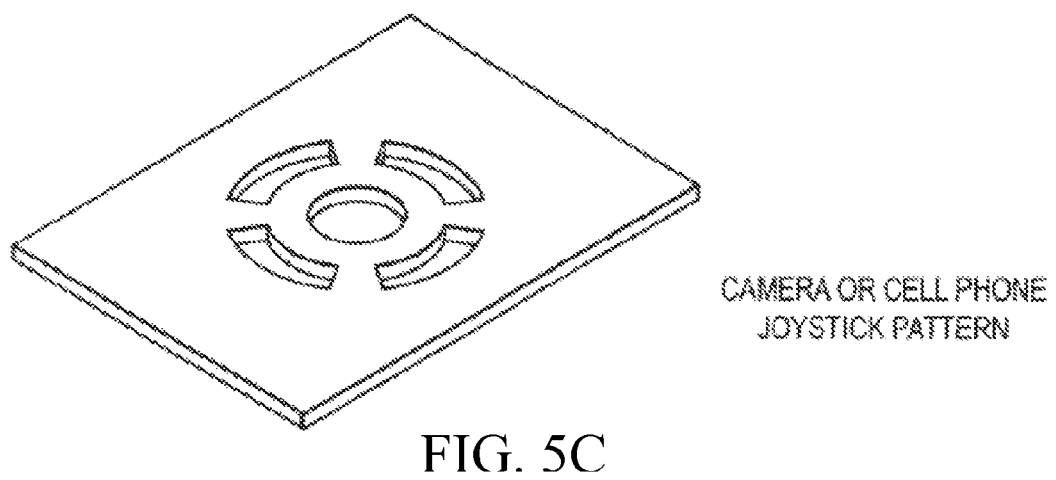
FIG. 5C shows an exemplary touchpad overlay with cut-outs according to various aspects of the present invention.

Another alternative embodiment for the disclosed aspects of the present invention is to use the disclosed touchpad with or without supporting input gesture recognition with cellular phones, other cellular devices, Apple Computer Inc.'s Ipod MP3 player, etc., with the computer-like touchpad replacing some or all of the buttons on devices. Touch input with or without touch-based gesture recognition would be an ideal replacement for Apple's Ipod click wheel interface. The touch pad would preferably be made round (alternatively, it would be rectangular with the housing of the device providing a round aperture to the touchpad device) and simply by skimming a finger over or touching the touchpad at the appropriate places on the touch pad, the Ipod would be commanded to perform the proper function such as raising or lowering the volume, fast forwarding, slowing down replay, changing the selection, etc. This type of round touchpad is also contemplated for use on cell phones to simulate the old-fashioned rotary dial action or placement of digits. The user touches the pad at the appropriate place around the circumference of the touch pad to select digits and enter them and then makes a dialing motion (stroking a thumb or finger around the circumference of the touchpad) to begin the call or touches the center of the pad to begin the call. Round pattern dialing is easily done with the thumb when the phone is being single-handedly held. With reference to FIG. 5, in another embodiment, the touchpad, 94, is further contemplated to be fitted with a solid overlay having 2 or more cutouts over its surface (the solid overlay with cutouts is preferably part of the cell phone or other device's housing and alternatively, the solid overlay, 90, with cutouts, 92, is applied to the touchpad surface separately) that only allows for certain areas of the touchpad to actually be touched to assist the user in assuring that only certain well-defined areas of the touchpad are touched. This greatly reduces the software detection requirements for the touchpad interface software since now the software need only detect when a certain defined area is touched and assigns a specific function to that touched area and reports that to the device controller. That is, the cutout areas would essentially be soft keys but without there being a plurality of different keys, instead, simply different soft key locations on the same touchpad but delineated physically so that certain other areas of the touchpad simply cannot be touched. It is further contemplated that, in many instances, the cutouts can be made large enough so that finger-stroke gestures can still be made and discerned. Because of the nature of modern mouse-like touchpad technology and how it works, the firmness of a persons touch that actually registers as a touch can also be provided for by software and this feature is also contemplated for use herein. Additionally, the touchpad, covered by a solid overlay with cutouts, would be recessed below the upper surface of the overlay (by as much as desired) helping to minimize false touches. This would be a much cheaper input gathering structure and would replace some or all of the many buttons and joystick-like controller of the cell phone, Ipod, camera, etc. It is contemplated that a few generic touchpad shapes and sizes could be manufactured and serve a host of input functions, replacing literally tons of buttons and switches, since now the solid overlay with cutouts on top of the touchpad defines the areas that can be touched or gestured (see exemplary drawings of FIG. 5(b) and FIG. 5(c)), and touchpad software, well understood in the art, defines what meaning is ascribed to these touched locations and gestures and what degree of firmness of touch is required to actually register the touch. Tapping and gesture (i.e., a finger stroke) recognition would further extend this new input-gathering device capability but is not required. This new input-gather device can be used to replace all or some of the buttons or joystick-like controllers on cell phones, portable electronic devices, cordless phones, mp3 players, PDAs, cameras, calculators, point of sales terminals, computers, computer monitors, game controllers, radio, stereos, TV, DVD players, set-top boxes, remote controls, automobile interfaces, appliances, household switches light and appliance switches, etc. Additionally, use of an overlay with cutouts is not absolutely necessary to practicing the above teachings. Similar functionality can be accomplished by simply embedding, embossing, or surface applying area-delineating markings, preferably with labels, to the touchpad itself and allowing software to accept only those touches that occur in these defined areas and to give the labeled meaning to these areas when so touched. However, use of an overlay with cutouts is currently greatly preferred because of the tactile delineation of areas it provides.

Returning to the Ipod example, because of the large memory currently available with the Ipod, it is also contemplated that a digital camera, similar to cell phone's camera be embedded in the Ipod and coupled to the Ipod controller and this inventive Ipod be operable for taking pictures and storing the pictures in the Ipod's memory. Another alternate embodiment for the disclosed aspects of the present invention is to use the viewfinder use detector, gaze tracker, and/or the disclosed internet connectability, herein described, in a video camera. As with the camera system disclosure, the viewfinder use detector can be used to enable or disable various aspects of the video camera system, such as turning the LCD display off when viewfinder use is detected. Gaze tracking is contemplated to be used to assist the video camera focusing or used to guide and select menu items. Internet connectability is contemplated be used to download sound or image files for editing or for uploading video recorded for editing or remote storage of the video images.

It is further contemplated that certain aspects of the presently disclosed invention have application beyond those disclosed herein. For instance, various voice recognition aspects of the present invention, such as use of a plurality of microphones or multiple different vocal utterances associated with the same command or delayed implementation of a command which corresponds to a recognized vocalization, are contemplated to have utility for many of the devices herein referenced and are anticipated to be incorporated therein. As an example, automatically connecting to the internet when a set of predetermined rules or conditions (such as time, date, status of equipment, etc) is met would be useful for the download/upload of information from/to the internet, like music, video, etc. for processing, storage, transmission to another party, etc. Those skilled in the art will undoubtedly see various combinations and alternative embodiments of the various aspects of the present invention herein taught but which will still be within the spirit and scope of the invention.

What is claimed is:

1. A system comprising:
   (a) a camera that is operable to take and store pictures, and that includes: (i) a lens, (ii) an image sensor, (iii) at least one microphone, (iv) a voice recognizer, and (v) a camera controller;
   (b) the camera controller including a control program having instructions to control and respond to the voice recognizer;
   (c) the voice recognizer coupled to at least one microphone and the camera controller, and configured to receive and process sounds into recognized words;
   (d) the camera further configured to maintain and store a plurality of recognizable words having different plain meanings and commonly associated with taking a picture, the recognition of any of which will cause the camera to take a picture;
   (e) wherein the voice recognizer is operable to receive a first and a second human sound spoken by the same person, and to recognize:
      (i) the first human sound as a first word from among the plurality that is assigned by the control program to be a command for the camera to take a picture; and
      (ii) the second human sound as a second word from among the plurality that is different from the first word and is also assigned by the control program to be the same camera command for the camera to take a picture.

2. The system of claim 1 wherein one of the words is "snap."

3. The system of claim 1 wherein one of the words is "cheese."

4. The system of claim 1 wherein one of the words is "shoot."

5. The system of claim 1 wherein one of the words is "click."

6. The system of claim 1 wherein the first and second words are different but are selected from a group of words including "snap," "cheese," "shoot" and "click."

7. The system of claim 1 wherein the camera controller is configured to delay the camera taking a picture for an intentional period of time after the voice recognizer recognizes the word.

8. The system of claim 1 further comprising:
   (d) first and second microphones that are oriented differently on the camera and configured to receive and detect sound emanating from around the camera; and
   (e) a selector configured to process the sound received from the microphones and determine which microphone to use for input to the voice recognizer based on sound levels received by the first and second microphones.

9. The system of claim 8 wherein the first microphone is located proximate the front of the camera and the second microphone is located proximate the back of the camera.

10. The system of claim 8 wherein the camera controller is configured to delay the camera taking a picture for an intentional period of time after the voice recognizer recognizes the word.

11. The system of claim 10 wherein the delay period is different depending upon a determined direction of the sound relative to the camera.

12. The system of claim 1 further comprising:
(d) first and second microphones oriented differently on the camera and configured to receive and detect sound emanating from around the camera; and
(e) the camera controller configured to allow a user of the camera to select which of the microphones to use to input sounds to the voice recognizer.

13. The system of claim 1 further comprising:
(d) first and second microphones oriented differently on the camera and configured to receive and detect sound signals emanating from around the camera; and
(e) a detector coupled to the microphones and configured to receive, process and combine sound signals detected at the microphones.

14. The system of claim 13 wherein the voice recognizer is configured to receive the combined sound signals from the detector.

15. The system of claim 1 further comprising:
(d) first and second microphones oriented differently on the camera and configured to receive and detect sounds emanating from different locations around the camera;
(e) a detector coupled to the microphones and configured to receive and process the sounds detected at the microphones for input to the voice recognizer; and
(f) the voice recognizer including at least two voice recognition algorithms configured to analyze signals input from the detector and recognize sounds to be used as a command by the camera controller.

16. The system of claim 15 wherein each microphone is associated with a corresponding voice recognition algorithm.

17. The system of claim 15 wherein each voice recognition algorithm can be applied to either the first or second microphone.

18. The system of claim 15 wherein the voice recognition algorithms are human selectable.

19. The system of claim 15 wherein the voice recognition algorithms are configured to generate multiple inputs to the camera controller, and the camera controller is configured to select one of the inputs to control the camera.

20. A system comprising:
(a) a camera that is operable to take and store pictures, and that includes: (i) a lens, (ii) an image sensor, (iii) at least one microphone, (iv) a voice recognizer, and (v) a camera controller,
(b) the camera controller including a control program having instructions to control and respond to the voice recognizer,
(c) wherein the voice recognizer is coupled to the microphone and the camera controller, and is configured to receive and process sounds into recognized words;
(d) the camera further configured to maintain and store a plurality of recognizable words having different plain meanings and commonly associated with a first camera command, the recognition of any of which will cause the camera to perform the first camera command;
(e) wherein the voice recognizer is operable to receive a first and a second human sound spoken by the same person, and to recognize:
(i) the first human sound as a first word from among the plurality that is used by the control program to perform a first camera command, and
(ii) the second human sound as a second word from among the plurality that is different from the first word and is used by the control program to perform the first camera command.

21. The system of claim 20 wherein the camera controller is configured with predefined words that are stored in memory and may be spoken by a camera user and recognized by the voice recognizer to perform a command.

22. The system of claim 20 wherein the camera controller is configured to allow a user of the camera to teach the system words for the voice recognizer to recognize and for the camera controller to associate with specific camera commands.

23. The system of claim 20 wherein the camera controller includes an indicator that is activated if the voice recognizer is unable to recognize a command from the sounds received at the microphone.

24. The system of claim 20 wherein the voice recognizer is configured to receive and process a third human sound to be recognized as a third word that is different from the first and second words and is used by the control program to perform a second camera command.

25. A voice recognizing camera comprising:
a) a camera including a lens, an image sensor, and a controller that is configured to control the camera;
b) a voice recognizer coupled to the controller and including a control program that is executed to recognize at least two different vocal utterances that indicate the same camera command;
c) at least two spaced apart microphones facing different directions and coupled to the voice recognizer, the microphones configured to output electrical signals representative of received sound energy; and
d) a detector coupled to the microphones that is configured to receive and measure the electrical signals output from the microphones, and to combine the signals for input to the voice recognizer.

26. A voice recognizing camera comprising:
at least two simultaneously operable microphones disposed in different locations on the voice recognizing camera,
a voice recognizer configured to process sounds received at either of the at least two microphones and thereafter recognize a voice command to be performed by the camera, and
a camera controller coupled to the voice recognizer that is configured to determine an approximate direction relative to the camera of a source of the recognized voice command by comparing the received signals at the at least two microphones.

27. The camera of claim 26 configured to selectively implement a delay before executing the associated voice command conditioned on the approximate direction of the source of the recognized voice command.

* * * * *